June 2, 1959  G. MALCOM  2,888,831
GEAR REDUCER AND FRAME THEREFOR
Filed Sept. 7, 1956  6 Sheets-Sheet 3

INVENTOR.
GLEN MALCOM
BY: Harold B. Hood
ATTORNEY

June 2, 1959

G. MALCOM 2,888,831

GEAR REDUCER AND FRAME THEREFOR

Filed Sept. 7, 1956

INVENTOR.
GLEN MALCOM
BY: Harold B. Hood
ATTORNEY

June 2, 1959        G. MALCOM        2,888,831
GEAR REDUCER AND FRAME THEREFOR

Filed Sept. 7, 1956        6 Sheets-Sheet 5

INVENTOR.
GLEN MALCOM
BY: Harold B. Hood
ATTORNEY

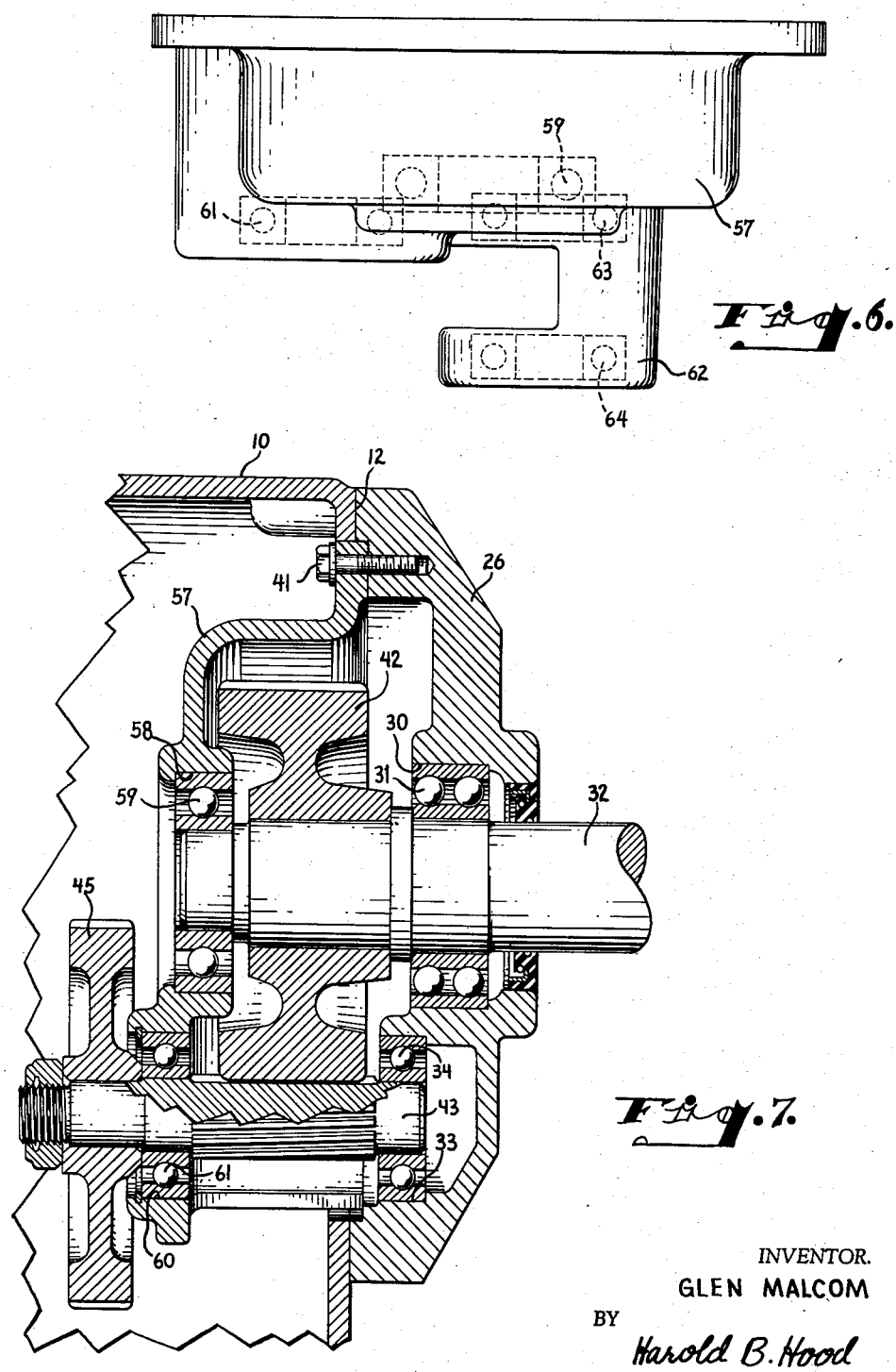

United States Patent Office 2,888,831
Patented June 2, 1959

2,888,831

GEAR REDUCER AND FRAME THEREFOR

Glen Malcom, Columbus, Ind., assignor to The Reliance Electric and Engineering Company, Cleveland, Ohio, a corporation of Ohio Application September 7, 1956, Serial No. 608,523

2 Claims. (Cl. 74—421)

The present invention relates to a gear reducer and frame therefor, and is primarily concerned with the details of construction of such an assembly, whereby the elements of a gear train for establishing a connection between aligned input and output shafts, may be assembled with a minimum of blind association of such elements.

A primary object of the invention is to provide a construction in which an input shaft, which may preferably be the spindle of an electric motor, may be positioned and supported in a shell or housing, whereafter a pinion may be engaged upon said input shaft, by manipulation through the opposite, open end of the housing; and in which the other elements of the gear train, including an output shaft, may be assembled, at a bench, upon a head or closure element for the opposite end of the housing, whereafter the subassembly thus carried by said head may be introduced into the housing, with all of its gears previously meshed, and may be brought into operative association with the first mentioned pinion, merely by assembling the head in spanning relation to said opposite, open end of the shell or housing.

A further object of the invention is to provide, as an element of the above-mentioned subassembly, a carrier formed to support bearing means for certain of the shafts of the train, some of which shafts are journalled, also, in bearing means supported from the head; the head and its bearing means being so designed that carriers of different designs may be selectively associated therewith to provide for varying degrees of speed reduction. A corollary object of the invention is to provide, in such an organization, means within the housing or shell for selectively supporting other carrier means, of different designs, for supporting bearing means for the input shaft.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 6 is a top plan view of a carrier comprising an element of the assembly shown in Fig. 4; and Fig. 7 is a section taken substantially in the plane indicated by the line 7—7 of Fig. 5 and looking in the direction of the arrows.

Figure 1:
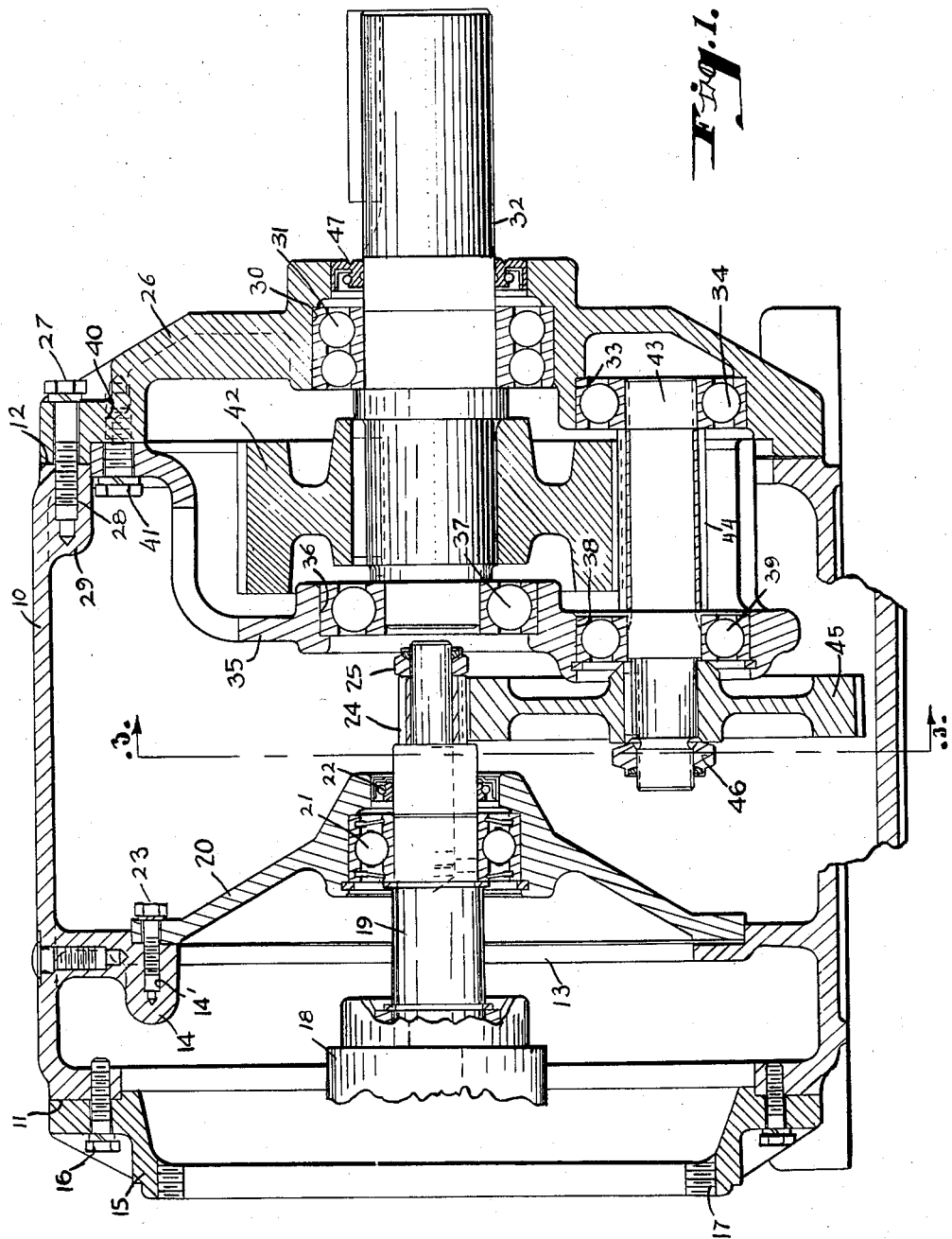
Fig. 1 is a longitudinal section through a gear reducing unit constructed in accordance with the present invention, the section being taken substantially on the line 1—1 of Fig. 3.
Figure 2:
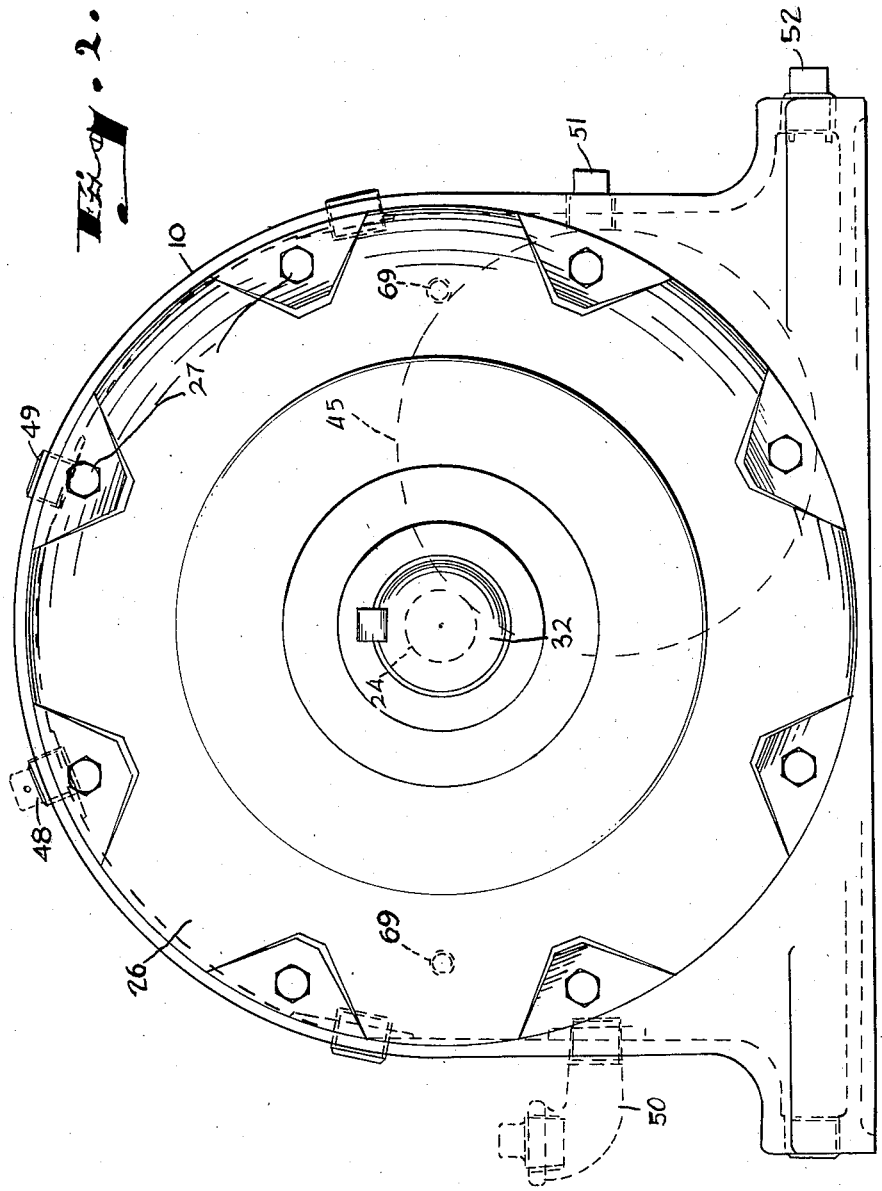
Fig. 2 is an end elevation of the unit illustrated in Fig. 1, taken from the right hand end of Fig. 1.
Figure 3:
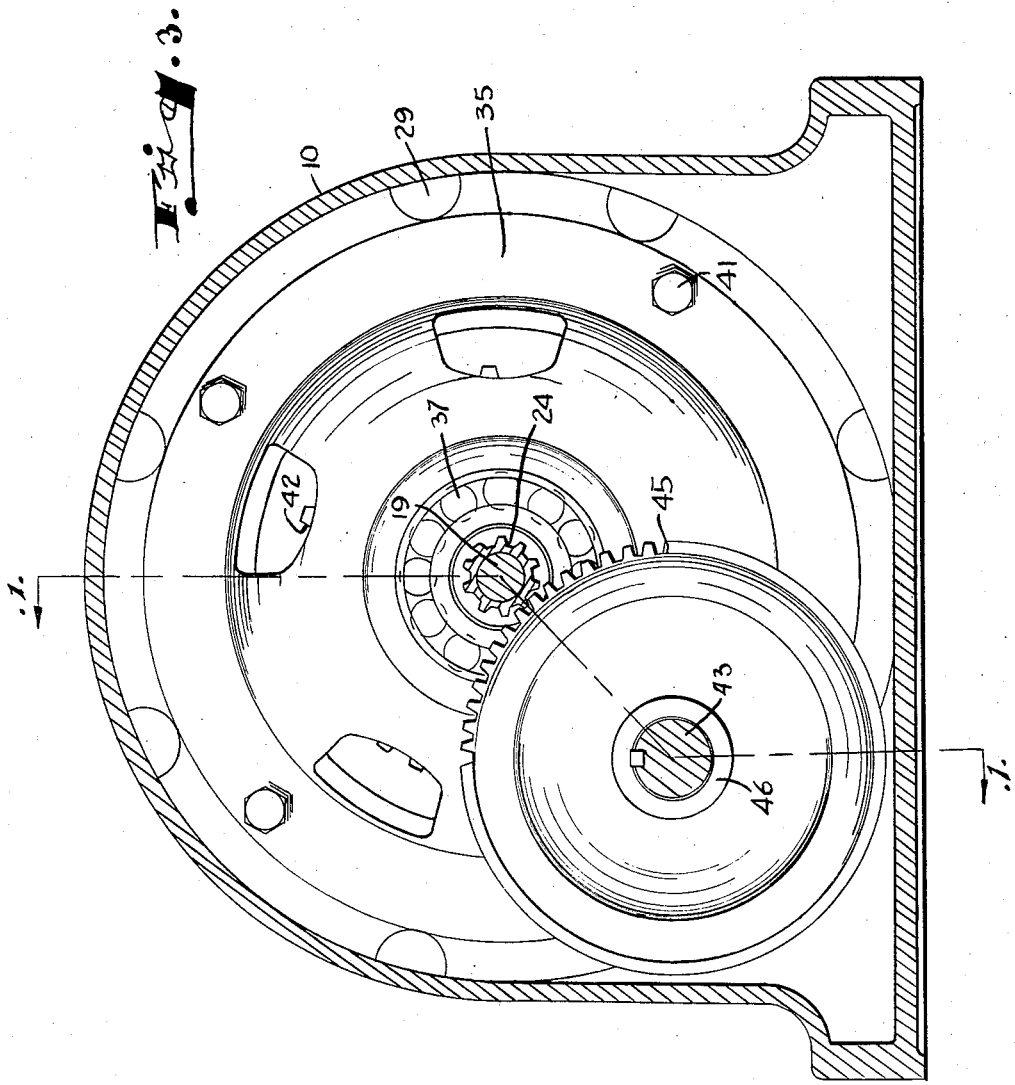
Fig. 3 is a transverse section taken substantially on the line 3—3 of Fig. 1.

Referring more particularly to the form of invention illustrated in Figs. 1 to 3, it will be seen that I have shown a housing or shell 10 which is generally cylindrical in cross section and which is open at its opposite ends, 11 and 12. Near the end 11, the shell is formed to provide inwardly-projecting, annularly arranged flange means 13 which is provided, at angularly spaced points about its periphery, with a plurality of nubs 14, each of which is formed with an internally threaded socket 14' opening toward the end 12 of the shell, for a purpose which will appear.

As shown, an adapter ring 15 is secured to the open end 11 of the shell 10, by means of screws 16, or other suitable fastening means; and said ring is formed with a plurality of threaded bores 17 whereby a closure head, or the frame of an electric motor (not shown) may be secured to the adapter ring.

At 18, I have suggested a portion of a motor frame constituting means for supporting an input shaft 19 which, as suggested above, may be a motor spindle. Said input shaft, when the motor or other supporting means is secured in place on the ring 15, projects into the interior of the shell 10, and beyond the flange means 13.

A carrier 20, which is formed with a port therethrough in which is supported a bearing 21, is adapted to be sleeved on the projecting end of the shaft or spindle 19, as shown; and the carrier 20 is so designed that, when it is so sleeved on said shaft, its outer periphery will register with the flange means 13 and may be secured thereto by means of a series of screws 23 taking into the threaded sockets 14'. It will be seen that, in the embodiment of the invention now under discussion, the carrier 20 is frusto-conical in section, whereby the bearing means 21 is located near the outboard end of the shaft 19 and is spaced from the flange means 13 toward the open end 12 of the shell 10.

Obviously, the carrier 20 may be entered into the housing or shell 10 through the open end 12 thereof, and may be manipulated into, and secured in, position through said open end 12 of the shell. Preferably, lubricant sealing means 22 will be carried in the port through the carrier 20.

Now, a pinion 24, of selected pitch diameter, may be mounted on the tip of the spindle 19, by manipulation through the still-open end 12 of the shell, and may be secured in place on said shaft by suitable means indicated at 25, likewise manipulated through the open end 12 of the shell.

A head or closure member 26 is proportioned and designed to span the open end 12 of the housing 10, and to be removably secured thereto by means of a series of screws 27 taking into threaded sockets 28 in nubs 29 formed, in an anular series, upon the shell 10. The head 26 is formed with a port 30 therethrough in which is mounted a bearing means 31. The parts are so proportioned and designed that, when the motor or head for the shell end 11, and the head 26, are mounted on the shell in the manner above described, the bearing means 31 will be coaxial with the shaft 19 and with the bearing means 21.

With the head 26 removed from the shell 10, an output shaft 32 is projected through the port 30, in supported relation to the bearing means 31, and a gear 42, of selected pitch diameter, is mounted on the shaft 32 near that face of the head 26 which, when the head is assembled with the shell 10, will be presented toward the interior of the shell.

The head 26 is further formed with a socket 33 in which is mounted a bearing 34 upon an axis parallel with, but offset from, the axis of the bearing 31.

A carrier 35 is formed to provide a socket 36 in which is supported a bearing 37 which, when the carrier 35 is secured to the inner face of the head 26, in a manner later to be described, will be coaxial with the bearing 31. The carrier 35 is further formed with a port 38 therethrough, in which is supported a bearing 39 which, when the carrier is so assembled with the head 26, will be coaxial with the bearing 34.

The head 26 is formed with a peripheral series of threaded sockets 40, opening through the inner face thereof; and the carrier 35 is so proportioned and designed that it may be secured to said inner face of said head 26 by means of a series of screws 41 taking into the sockets 40.

After the gear 42 is mounted on the shaft 32, one end of a shaft 43 is entered in the bearing 34. A pinion 44, of selected pitch diameter to correspond to the gear 42, is carried by the shaft 43 in mesh with the gear 42. Now, the carrier 35 is secured in place on the head 26, with the inner end of the shaft 32 taking a journal mounting in the bearing 37, and with the shaft 44 taking a journal mounting, at a point adjacent the inner end of the pinion 44, in the bearing 39.

A gear 45, of selected pitch diameter to correspond with the selected pinion 24, is now mounted on the inner end of the shaft 43, outboard with respect to the bearing 39, but closely adjacent thereto, and said gear 45 is secured in place by retaining means indicated at 46.

The parts are so proportioned and designed that, when the subassembly comprising the head 26, the carrier 35, the shafts 32 and 43, the gears 42 and 45 and the pinion 44, is now secured in place on the open end 12 of the shell 10, the gear 45 will come into meshing engagement with the pinion 24. It will be apparent that, because of the construction just described, the only blind assembly step constitutes the meshing of the gear 45 with the pinion 24.

A lubricant seal 47 is preferably provided at the outer end of the socket 30 in the head 26; and I prefer to provide vent plugs at 48 and 49, an elbow connection at 50 and a pipe plug at 51, as well as a drain plug at 52.

The construction above described lends itself admirably to functional modification, by substitution of selected parts, to provide for the manufacture of reducer units of different capacities, while requiring maintenance of stocks of a minimum number of different parts. Thus, whereas the structure just described, and illustrated in Figs. 1 to 3, provides for a double speed reduction, most of the same parts can be used in the manufacture of a reducer unit providing for a triple reduction. In Figs. 4 to 7, I have shown such a modified assembly.

In those figures, I have illustrated the same shell 10, open at its opposite ends 11 and 12, the same adapter ring 15 secured to the shell end 11 by screws 16 and provided with threaded bores 17 for the connection thereto of, for instance, an electric motor frame. As in the previously-described assembly, the shell 10 includes the flange means 13 with its socketed nubs 14; and I have shown, at 18, a portion of a motor frame in which is supported a spindle 19' which is somewhat shorter than the spindle 19.

Figure 4:
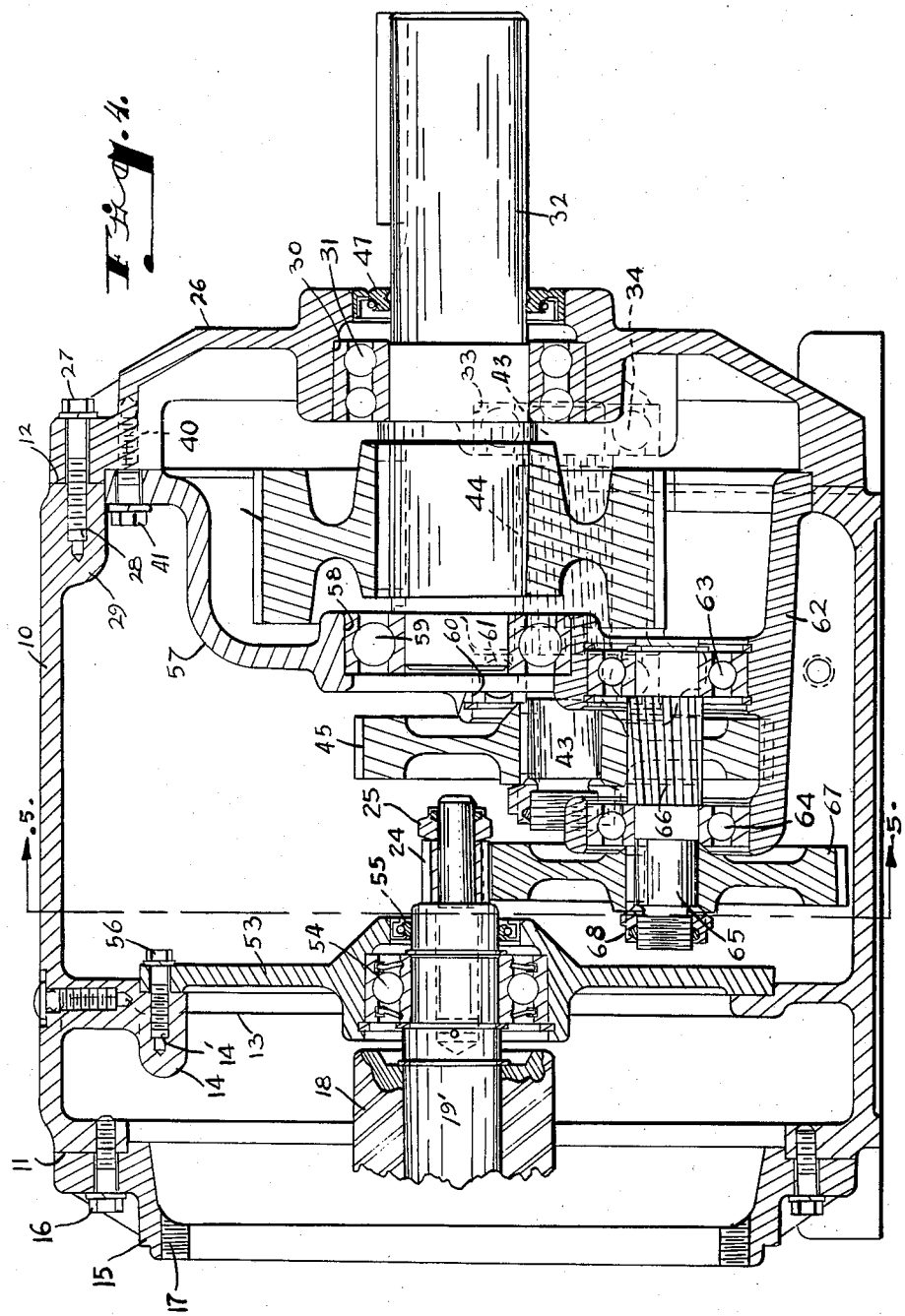
Fig. 4 is a longitudinal section, similar to Fig. 1, but showing a different subassembly carried upon the closure head and providing a triple reduction, the section being taken substantially on the line 4—4 of Fig. 5.
Figure 5:
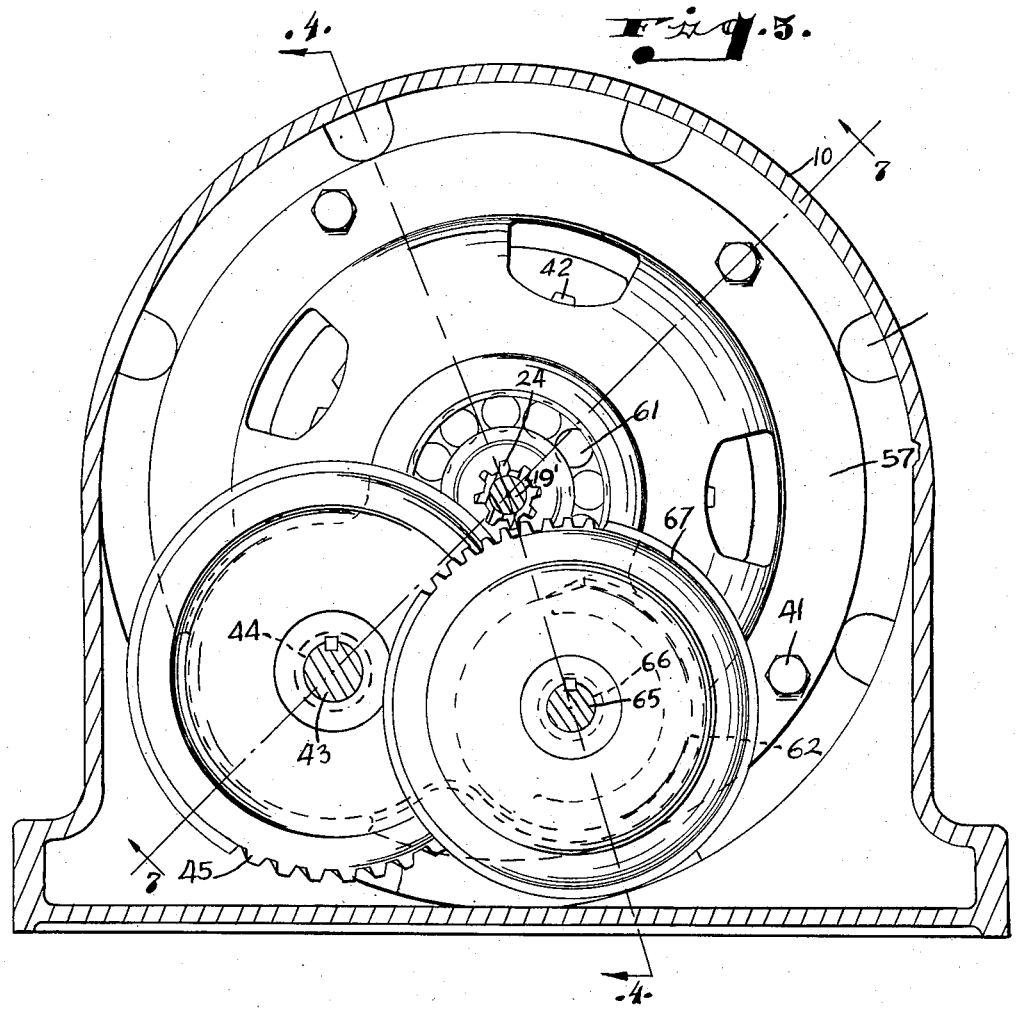
Fig. 5 is a transverse section taken substantially on the line 5—5 of Fig. 4.

A carrier 53 has been substituted, in Fig. 4, for the carrier 20, and it will be seen that the two carriers are substantially identical except that the carrier 53 is generally planar in cross section, rather than frusto-conical like the carrier 20, whereby the bearing 54, supported from the carrier 53, is located substantially in the plane of the flange means 13 to cooperate properly with the shorter spindle or shaft 19'. A lubricant seal 55 may preferably be supported from the carrier 53 in coaxial relation with the bearing 54.

As in the previous assembly, the motor frame, or other supporting means for the shaft 19', may be secured in place on the shell end 11 and/or ring 15, whereafter the carrier 53 will be sleeved on the end of the shaft 19' and will be secured in place by means of screws 56 taking into the sockets 14' of the nubs 14. These operations can be carried on through the open end 12 of the shell 10; and thereafter, a pinion 24 of selected pitch diameter will be mounted on the tip of the shaft 19' and secured in place by suitable means, as indicated at 25.

The head 26, as before, carries bearing means 31 in its bore 30, and the unit output shaft 32 penetrates, and is journalled in, said bearing means 31. As before, bearing means 34 is mounted in the socket 33 of the head 26, and one end of the shaft 43 is journal mounted in said bearing means 34. The gear 42, of selected pitch diameter, is mounted on the shaft 32 adjacent the bearing means 31, and the pinion 44 is mounted on the shaft 43 to mesh with the gear 42.

Now, the carrier 57 is secured to that face of the head 26 which, when said head is assembled with the shell 10, will be presented toward the interior of the shell. Screws 41 like those previously described will be used to secure the carrier 57 in place.

The carrier 57 is centrally formed with a port 58, similar to the port 36, and in which is supported a bearing 59. As the carrier 57 is moved into place, the inner end of the shaft 32 takes a journal mounting in the bearing 59. The carrier 57 is further formed with a port 60, corresponding to the port 38 of the carrier 35, and supporting a bearing 61; and as the carrier 57 is moved into place, the shaft 43 takes a journal mounting in the bearing 61.

At a point angularly offset from the port 60, the carrier 57 is formed with a protruding snout 62 which projects, in a direction away from the head 26, to a point beyond the innermost end of the shaft 43; and said snout is formed to support bearings 63 and 64 in spaced relation upon a common axis parallel with the axis of the shaft 32. A shaft 65 is journalled in the bearings 63 and 64, and supports, therebetween, a pinion 66. The parts are so proportioned and designed that the pinion 66, of selected pitch diameter, meshes with the gear 45 which is mounted, outboard, on the shaft 43 in the manner above described in connection with Fig. 1. The shaft 65 further carries, outboard with respect to the bearing 64, a further gear 67 which is held in place on the shaft 65 by securing means such as 68.

When the subassembly, comprising the carrier 57, the shafts 32, 43 and 65, the gears 42, 45 and 67, and the pinions 44 and 66, has been completed, the head 26 will be mounted on the end 12 of the shell 10, by means of the screws 27; and the parts are so proportioned and designed that, as the head 26 is moved into place, the gear 67 will move into meshing engagement with the pinion 24. It will be seen, thus, that the meshing of the gear 67 with the pinion 24 is the only blind assembly step involved in the construction of the unit of Figs. 4 to 7.

I claim as my invention:

1. A gear reduction unit comprising a shell open at both ends, a first closure element, means for removably securing said first closure element to said shell in closing relation to one end of said shell, said first closure element being formed with a port therethrough, a first shaft received in and penetrating said port to project into said shell when said closure element is so secured to said shell, interior, annularly-arranged flange means within said shell near said one end thereof, a first carrier enterable into said shell through the other end thereof, means for removably securing said carrier to said flange means, said carrier being formed with a port therethrough coaxial, when said closure element and said carrier are so secured, with said closure element port, a first bearing means supported in said carrier port, said first shaft being journalled in, and penetrating, said bearing means, a pinion drivingly supported from said shaft outboard beyond said bearing means, a second closure element, means for removably securing said second closure element to said shell in closing relation to said other end of said shell, said second closure element being formed with a port therethrough which, when said closure elements are so secured to said shell, is coaxial with said first closure element port, a second bearing means supported in said second closure element port, a second carrier, means for removably securing said second carrier to that face of said second closure element which, when said second closure element is so secured to said shell, is presented toward the interior of said shell, a third bearing means supported from said second carrier and coaxial with said second bearing means when said second carrier is so secured to said second closure element, a second shaft journalled in said second and third bearing means and projecting outwardly from said second closure element, a first gear drivingly supported from said second shaft between said second and third bearing means, a fourth bearing means supported from said second closure element on an axis parallel but offset with respect to the common axis of said first and second bearing means, a fifth bearing means supported from said carrier and coaxial with said fourth bearing means when said second carrier is so secured to said second closure element, a third shaft journalled in said fourth and fifth bearing means, a second pinion drivingly supported from said third shaft and meshing with said first gear, a second gear drivingly supported from said third shaft, means projecting from said second carrier toward said first carrier, a sixth bearing means and a seventh bearing means supported from said projecting means upon a common axis parallel with, but angularly offset from, the common axis of said fourth and fifth bearing means, a fourth shaft journalled in said sixth and seventh bearing means, a third pinion drivingly supported from said fourth shaft between said sixth and seventh bearing means and meshing with said second gear, and a third gear drivingly supported from said fourth shaft and meshing with said first-named pinion.

2. For use in a gear reducer including a shell open at one end and having a first shaft projecting thereinto from the other end of said shell, with a pinion carried on said shaft within said shell, a subassembly comprising a head member, means for removably securing said head member to span the open end of said shell, said head member having a substantially central port therethrough, a first bearing means supported in said port, a shaft journalled in and penetrating said bearing means, a second bearing means supported from said head member upon an axis offset but parallel with respect to the axis of said first bearing means, a further shaft having one end journalled in said second bearing means, a first gear drivingly supported from said shaft journalled in said first bearing means, a further pinion drivingly supported from said further shaft and meshing with said first gear, a carrier, means for removably securing said carrier to that face of said head member which, when said head member is so secured to said shell, is presented toward the interior of said shell, a third bearing means supported from said carrier and engaging said first shaft, when said carrier is so secured to said head member, to provide a further journal mount for said first shaft at the side of said first gear remote from said first bearing means, a fourth bearing means supported from said carrier and engaging said further shaft, when said carrier is so secured to said head member, to provide a further journal mount for said further shaft at the side of said further pinion remote from said second bearing means, a second gear drivingly supported from said further shaft, outboard with respect to said fourth bearing means, means projecting from said carrier away from said head member and supporting a fifth bearing means and a sixth bearing means disposed on a common axis parallel but angularly offset with respect to the axis of said fourth bearing means, an additional shaft journalled in said fifth and sixth bearing means, a second pinion drivingly supported from said additional shaft between said fifth and sixth bearing means and meshing with said second gear, and a third gear drivingly supported from said additional shaft and more remote from said head member than is said second pinion, said third gear meshing, when said subassembly is mounted on said shell, with said first-named pinion.

References Cited in the file of this patent
UNITED STATES PATENTS

| | | |
|---|---|---|
| 1,971,968 | Schmitter | Aug. 28, 1934 |
| 2,152,607 | Schmitter et al. | Mar. 28, 1939 |
| 2,600,697 | Schmitter | June 17, 1952 |